Figure 1:
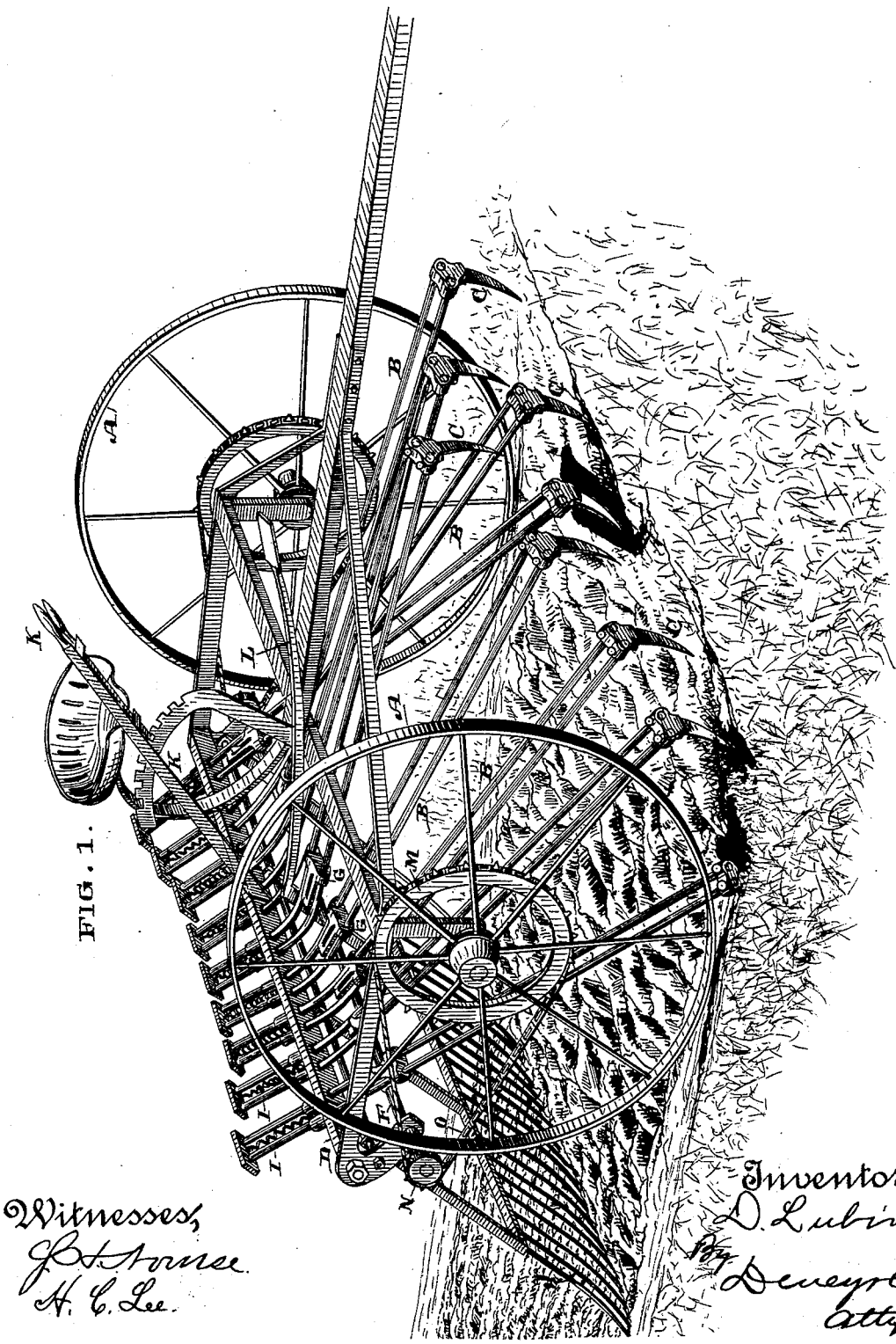

(No Model.) 3 Sheets—Sheet 1.

D. LUBIN.
HOEING AND RAKING MACHINE.

No. 357,841. Patented Feb. 15, 1887.

Witnesses,
J. H. Rouse.
H. C. Lee.

Inventor,
D. Lubin
By Deneyr &
Attys

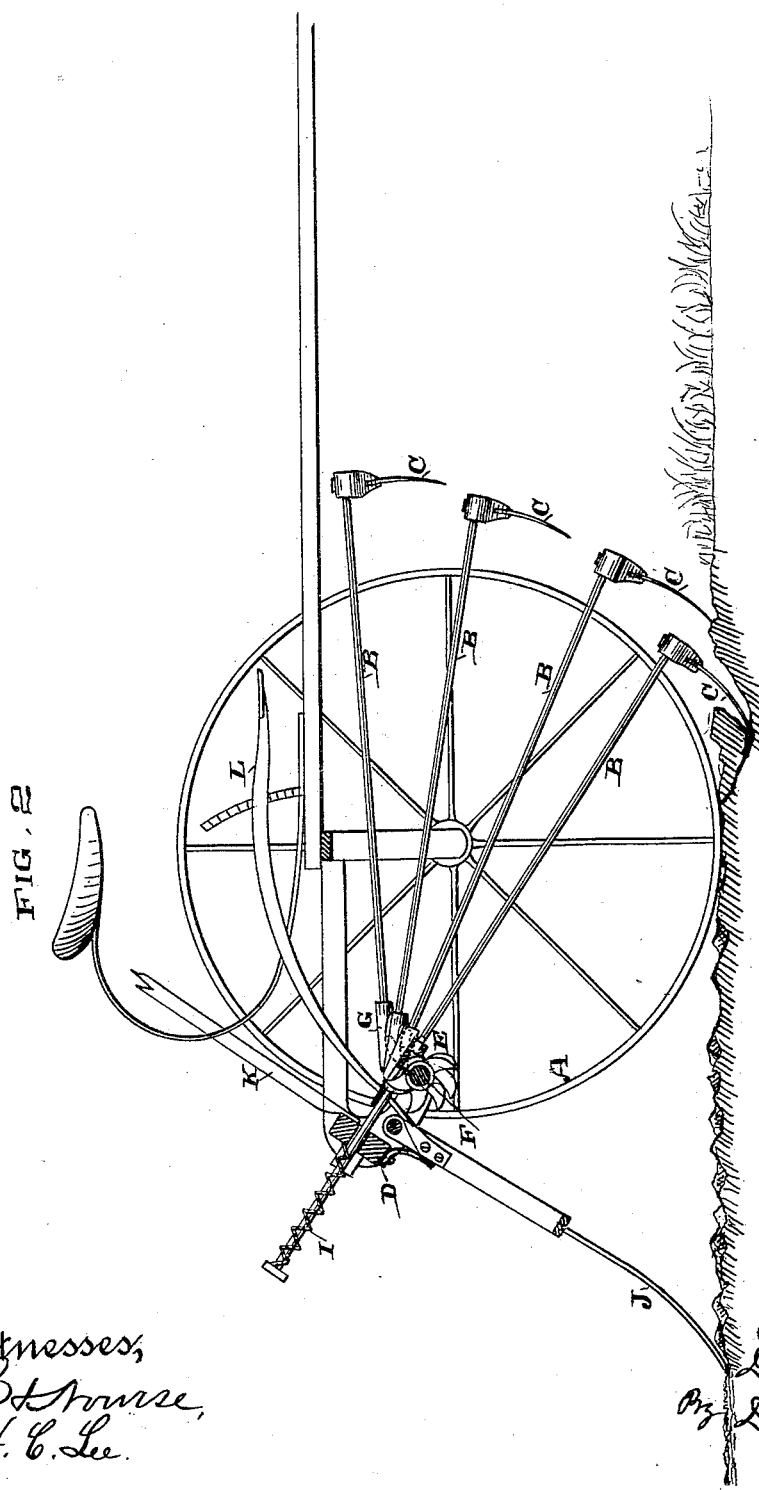

(No Model.) 3 Sheets—Sheet 3.
D. LUBIN.
HOEING AND RAKING MACHINE.
No. 357,841. Patented Feb. 15, 1887.
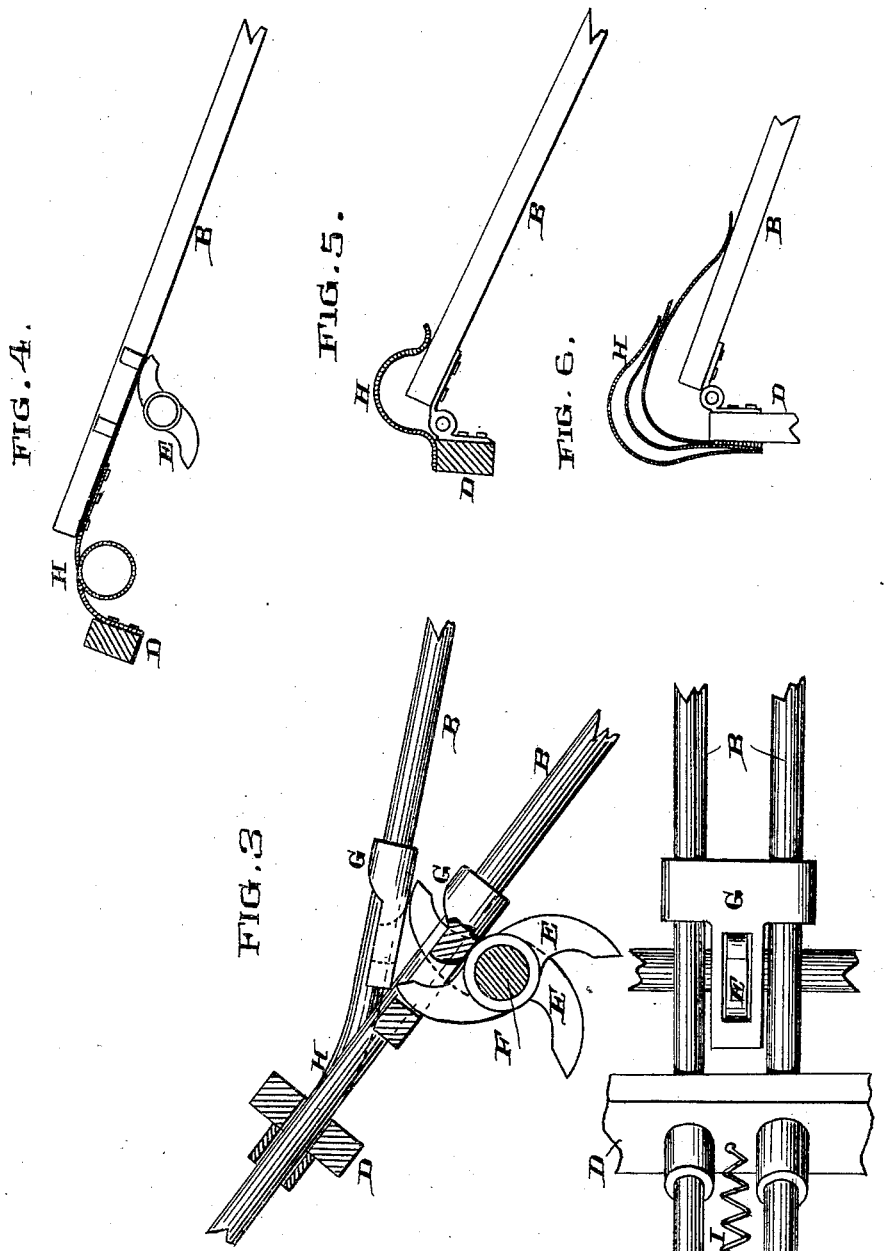

UNITED STATES PATENT OFFICE.

DAVID LUBIN, OF SACRAMENTO, CALIFORNIA.

HOEING AND RAKING MACHINE.

SPECIFICATION forming part of Letters Patent No. 357,841, dated February 15, 1887.

Application filed September 24, 1886. Serial No. 214,462. (No model.)

*To all whom it may concern:*

Be it known that I, DAVID LUBIN, of Sacramento, Sacramento county, State of California, have invented an Improvement in Hoeing and Raking Machines; and I hereby declare the following to be a full, clear, and exact description of the same.

My invention relates to an apparatus which is especially designed for working and cultivating the soil; and it consists of a series of arms carrying at their outer ends blades or hoes and a mechanism by which these arms are raised and caused to strike upon the ground forcibly in the manner of a hand-hoe and be moved backward at the same time, so as to move and loosen up that portion of the soil which they have cut off. This device is mounted upon a wheeled carriage, so as to be drawn along over the ground; and in connection with these hoes I have a mechanism for operating them, which will be more fully described by reference to the accompanying drawings, in which—

Figure 1 is a perspective view. Fig. 2 is a vertical section. Fig. 3 is an enlarged side view and a plan of the handles and cams. Figs. 4, 5, and 6 are modifications of the handles and springs.

A A are bearing-wheels having an axle and seat-carrying frame, and B B are the handles of the mechanically-operating hoes C, which are fixed at the outer ends of these handles, as shown. These hoes consist of one or more thin blades to each of the handles, and the handles are supported in a frame-work, D, so as to stand at such an angle or inclination that when the hoes are struck downward upon the ground it will produce a movement very similar to that which takes place when this operation is performed by hand. These handles B pass loosely through the guide-frame D, so that when the hoes have been struck downward upon the ground they may be instantly drawn or pushed backward a short distance, and thus loosen and lift out of place the portion of earth which has been cut off by the downward blow of the hoe, thus turning it over and separating it from the hard ground from which it was cut away, this operation being carried on continually and by all the hoes, which are supported in a transverse line with the bearing-wheels of the vehicle. It will be manifest that the earth will be thoroughly loosened and broken up by this action as the vehicle passes over the ground. In order to produce these movements of the hoes I employ a cam, E, of any suitable or desirable construction for each hoe.

In the present case I have shown an ordinary two-armed cam, which is mounted on a shaft, F, just below the line of hoe-handles and at a point near the fulcrum-support and guide. It will be manifest that when this cam is rotated, so as to come in contact with a suitably-constructed tappet upon the hoe-handle, it will raise the handle from the ground, and when it has passed this tappet it will let the hoe fall with whatever force may be imparted to it by a suitable weight or spring. After the hoe has struck the ground and become embedded into it by this movement, the cam strikes another tappet as it continues its rotation and forces it backward, thus moving the hoes back and loosening the ground, as before described.

In order to operate this mechanism practically I have found it desirable to make the hoe-handle in the form of two parallel rods united at their upper ends and connecting with the hoe-blade at the lower end. G is a tappet, which is fixed across these two handles, so that when the cam E strikes this tappet it will raise the handles, and the hoes at the outer end will be elevated to as great a height as may be desired for the purpose of delivering an efficient blow. As soon as the cam has reached a nearly or quite vertical position above its center it will pass this tappet, and the action of a weight or, preferably, a spring, H, will cause the hoe to be thrown down forcibly, so as to strike the ground. This spring may be formed by making the handles B so elastic that they may be bent into a curve when the hoes are raised, as in Fig. 1, and they will forcibly straighten when relieved; or the springs may be independent coiled or spiral ones. The arm of the cam now projects upward through a slot or space between the two handles and at the rear of the tappet, and as it continues its revolution it strikes the rear edge of the slot or another tappet, and thus forces the handles of the hoes backward, the handles sliding through the guide-bar D, which forms their fulcrum. This guide-bar is so journaled that it may turn upon its axis and allow the handles to be raised, as before described; or it may be fixed and the handles may be connected with independent guides, which turn upon this bar, or other mechanical constructions may be employed which will produce a similar action, the design being to allow the handles to be turned about their fulcrum, so that the hoes may be raised and forced downward, and also allow the handles to be drawn or pushed back after the hoes have struck the ground, so as to pull away and loosen the soil which has been cut off.

In the present case I have shown springs I attached to the cross-bar uniting the rear ends of the parallel bars, and also connected with the guide or fulcrum bar of the handle forming each handle. These springs serve to return the hoes by pulling the handles backward through the guides as soon as they are released from the action of the cam, and they are then ready to be lifted, dropped, and drawn backward again.

It will be manifest that various changes may be made in this mechanism. The handles may be made flat or square and made in single rods or bars running through a similarly-shaped guide and having suitable tappets for the cam to act upon in lifting and drawing the handle back. The handles may be made more or less elastic, so that the blow will be similar to that given by any elastic arm or beater which is forced forward or downward with considerable momentum, as shown in Fig. 1.

In order to rotate the cam-shaft, I have at present shown a chain-wheel, M, fixed to one of the bearing-wheels of the vehicle, and a similarly-formed chain-pinion, N, upon the cam-shaft, and driving-chain O, passing around these two, so as to cause the cam-shaft to rotate at any desired rate of speed as the vehicle progresses forward, being drawn by horses or other power. It will be manifest that the blows of the hoes must be given and the hoes drawn back with a sudden movement, so as to operate faster than the vehicle is moved in the forward direction. This action will cut off small slices of the earth, draw it backward, loosening it up, leaving it in piles or ridges, which it will be desirable to have harrowed or smoothed down afterward. This is done by means of elastic arms or teeth J, which project downward behind the vehicle, standing at an inclination backward therefrom, so that when they are drawn over the ground which has already been loosened up by the hoes they will smooth it out and leave it in a fine and level condition.

A lever, K, is connected with the fulcrum-shaft or guides of the hoe-handles, so that by raising this lever up and holding it by a suitable rack the hoes will be raised out of the ground, and may be thus held up from the surface while the vehicle is being driven to or from the field. The cultivating-rakes J, which follow behind, may be also raised in the same manner by means of a lever, L, which is also within convenient reach of the driver.

It will be manifest that various mechanisms may be employed to produce the results which I have here described, which may differ slightly from the construction that I have here shown, without essentially altering the operation or result, the aim being to employ an arm or handle moving about a fulcrum, so as to allow the hoes to be raised and thrown downward with an elastic forcible blow, so as to penetrate the surface of the soil, and then be quickly drawn or pushed backward, so as to pull away and loosen the slice which has been cut off by the blow.

Having thus described my invention, what I claim as new, and desire to secure by Letters Patent, is—

1. An inclined handle having one or more hoes or blades fixed to its outer end, a fulcrum about which the inner end is movable, so that it may be raised about its fulcrum, a spring or weight by which the hoes are forcibly struck downward into the soil when released, and a means, substantially as described, for drawing the hoes backward, substantially as herein described.

2. The arms or handles fulcrumed at one end upon a vehicle-frame and extending outward from the fulcrum, and hoes or blades fixed to the outer ends of these arms so as to strike into the ground when the arms are thrown downward, in combination with lifting arms or cams whereby the hoes may be raised, springs by which they may be forcibly thrown downward after having been raised, and lifting arms or cams for drawing the hoes backward, substantially as herein described.

3. The hoes or blades mounted upon arms or handles extending to fulcrums and guides through which these handles pass loosely, so as to slide backward and forward, in combination with cams or arms, and tappets upon the handles which are engaged by the cams, so as to first raise the hoes and allow them to fall after the cam has passed the tappet, and other tappets or projections which are engaged by the cam as it continues its revolution, so as to move the hoes back after they have entered the ground, substantially as herein described.

4. Hoes or blades fixed to the forward ends of handles, which extend backward through guides mounted upon a fulcrum or fulcrum-shaft about which they may rotate, so as to allow the hoes to rise and fall, and through which the handles slide backward by the action of the rotating cam, in combination with springs by which the handles are forced forward to their normal position after being released from the cam, substantially as herein described.

5. The hoes or blades fixed to the outer ends or arms, having fulcrums about which they move, so as to raise and lower the hoes, and a mechanism by which the hoes are moved upward and downward and given a backward movement after entering the soil, in combination with the rake or harrow teeth extending downward into the ground in rear of the hoes, substantially as herein described.

In witness whereof I have hereunto set my hand.

DAVID LUBIN.

Witnesses:
SIMONTON ARCHIBALD MURPHY,
WILLIAM SKEELS.